US011127939B2

(12) United States Patent
Detig-Karlou et al.

(10) Patent No.: US 11,127,939 B2
(45) Date of Patent: Sep. 21, 2021

(54) ELECTRODE MATERIAL, USE OF AN ELECTRODE MATERIAL FOR A LITHIUM-ION-BASED ELECTROCHEMICAL CELL, LITHIUM-ION-BASED ELECTROCHEMICAL CELL

(71) Applicant: Bayerische Motoren Werke Aktiengesellschaft, Munich (DE)

(72) Inventors: Kamelia Detig-Karlou, Pullach (DE); Ann-Christin Gentschev, Belmont, CA (US); Miriam Karin Keppeler, Singapore (SG); Sung-Jin Kim, Munich (DE); Madhavi Srinivasan, Singapore (SG)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 84 days.

(21) Appl. No.: 16/229,725

(22) Filed: Dec. 21, 2018

(65) Prior Publication Data
US 2019/0140256 A1  May 9, 2019

Related U.S. Application Data

(63) Continuation of application No. PCT/EP2016/064702, filed on Jun. 24, 2016.

(51) Int. Cl.
*H01M 4/131* (2010.01)
*H01M 4/1391* (2010.01)
(Continued)

(52) U.S. Cl.
CPC ......... *H01M 4/131* (2013.01); *H01M 4/0471* (2013.01); *H01M 4/1391* (2013.01);
(Continued)

(58) Field of Classification Search
CPC ....... H01M 10/0525; H01M 2004/021; H01M 4/0471; H01M 4/131; H01M 4/1391;
(Continued)

(56) References Cited

U.S. PATENT DOCUMENTS

2003/0082453 A1  5/2003  Numata et al.
2003/0086863 A1  5/2003  Noguchi et al.
(Continued)

FOREIGN PATENT DOCUMENTS

| CN | 1258241 C | 5/2006 |
|---|---|---|
| CN | 101898799 A | 12/2010 |
| EP | 2 717 360 A1 | 4/2014 |

OTHER PUBLICATIONS

International Search Report (PCT/ISA/210) issued in PCT Application No. PCT/EP2016/064702 dated Aug. 3, 2016 (four (4) pages).

(Continued)

*Primary Examiner* — Lingwen R Zeng
(74) *Attorney, Agent, or Firm* — Crowell & Moring (57) ABSTRACT

Electrode material, for a lithium-ion-based electrochemical cell, containing primary particles of a Mn-containing spinel-type metal oxide selected from the group consisting of spinel-type lithium-nickel-manganese-oxide, spinel-type lithium-manganese-oxide, and mixtures thereof. Mn of the Mn-containing spinel-type metal oxide is partially substituted with a substitution-element selected from the group consisting of Si, Hf, Zr, Fe, Al, V and mixtures thereof and the primary particles are aggregated in order to form secondary particles, with the secondary particles having the shape of a microsphere.

16 Claims, 5 Drawing Sheets

(51) Int. Cl.
    *H01M 4/505*     (2010.01)
    *H01M 10/0525*   (2010.01)
    *H01M 4/38*      (2006.01)
    *H01M 4/04*      (2006.01)
    *H01M 4/525*     (2010.01)
    *H01M 4/02*      (2006.01)

(52) U.S. Cl.
    CPC ........... *H01M 4/386* (2013.01); *H01M 4/505* (2013.01); *H01M 4/525* (2013.01); *H01M 10/0525* (2013.01); *H01M 2004/021* (2013.01)

(58) Field of Classification Search
    CPC ...... H01M 4/386; H01M 4/505; H01M 4/525; Y02E 60/10
    See application file for complete search history.

(56) References Cited

U.S. PATENT DOCUMENTS

2009/0289218 A1* 11/2009 Kajiya ................ H01M 4/505
                                              252/182.1
2013/0224606 A1* 8/2013 Koh ...................... H01G 11/62
                                              429/332

OTHER PUBLICATIONS

Written Opinion (PCT/ISA/237) issued in PCT Application No. PCT/2016/064702 dated Aug. 3, 2016 (six (6) pages).

Akimoto J., et al., "Direct Observation of the Bulk Degradation of $Li_{1.1}Mn_{1.9}O_4$ Single Crystals after High-Temperature Storage", Electrochemical and Solid-State Letters, 2005, pp. A361-A364, vol. 8, No. 7 (four (4) pages).

Hirayama M., et al., "Characterization of Electrode/Electrolyte Interface with X-Ray Reflectometry and Epitaxial-Film $LiMn_2O_4$ Electrode", Journal of The Electrochemical Society, 2007, pp. A1065-A1072, vol. 154, No. 11 (eight (8) pages).

Chinese-language Office Action issued in Chinese Application No. 201680087075.5 dated May 26, 2021 with English translation (16 pages).

* cited by examiner

ELECTRODE MATERIAL, USE OF AN ELECTRODE MATERIAL FOR A LITHIUM-ION-BASED ELECTROCHEMICAL CELL, LITHIUM-ION-BASED ELECTROCHEMICAL CELL

CROSS REFERENCE TO RELATED APPLICATION

This application is a continuation of PCT International Application No. PCT/EP2016/064702, filed Jun. 24, 2016, the entire disclosure of which is herein expressly incorporated by reference.

BACKGROUND AND SUMMARY OF THE INVENTION

The invention relates to an electrode material containing primary particles of a manganese-containing spinel-type metal oxide, manganese of the manganese-containing spinel-type metal oxide is partially substituted, and the primary particles are aggregated to form secondary particles, with the secondary particles having the shape of microspheres. The electrode material of the invention can be used in a lithium ion-based electrochemical cell. The invention further relates to a lithium ion-based electrochemical cell.

In order to improve state of the art electrochemical cells, such as lithium ion batteries, there is a demand for electrode materials with improved electrochemical performance.

This task is accomplished by an electrode material according to one or more aspects of the disclosure.

In a first aspect of the invention, an electrode material is provided, for a lithium ion-based electrochemical cell, including primary particles of a Mn-containing spinel-type metal oxide selected from the group consisting of spinel-type lithium-nickel-manganese-oxide, spinel-type lithium-manganese-oxide, and mixtures thereof, with Mn of the Mn-containing spinel-type metal oxide being partially substituted with a substitution-element selected from the group consisting of Si, Hf, Zr, Fe, Al, V and mixtures thereof, and the primary particles are aggregated in order to form secondary particles, the secondary particles having the shape of microspheres.

The electrode material in particular refers to a high voltage electrode material and can be an active electrode material of the positive electrode in a lithium ion-based electrochemical cell. As used herein, the term "lithium-ion-based electrochemical cell" in particular refers to rechargeable lithium-ion-batteries.

The primary particles can include Mn-containing spinel-type metal oxide. Examples of the Mn-containing spinel-type metal oxides are $LiNi_{0.5}Mn_{1.5}O_4$ (LNMO) and $LiMn_2O_4$. The primary particles are preferably nanoparticles (i.e., particles with a diameter of at least 1 nm and less than 1000 nm). The primary particles are preferably not of an octahedral geometry, which is in contrast to $LiNi_{0.5}Mn_{1.5}O_4$-spinels and $LiMn_2O_4$-spinels, and can for instance be plate-shaped.

Mn of the Mn-containing spinel-type metal oxide is partially substituted with at least one or exactly one substitution-element selected from the group consisting of Silicon (Si), Hafnium (Hf), Zirconium (Zr), Iron (Fe), Aluminium (Al), Vanadium (V) and mixtures thereof.

The smaller primary particles are aggregated with one another and thus form larger secondary particles, the latter being shaped as microspheres. The secondary particles can include the primary particles.

As used herein, the term "aggregated primary particles" means that the primary particles are permanently attached and connected with each other, forming a mechanically and electrochemically stable microsphere as a secondary particle. The inventive electrode materials thus include particles ("primary particles"), with two or more primary particles from an independent structure, i.e., a secondary structure, having the shape of microspheres ("secondary particles"). A secondary particle, i.e., a microsphere, can include more than 10, preferably more than 50, or even more than 100 primary particles.

The primary particles are for instance not spherical particles, i.e., they are not hollow.

Microspheres are spherical particles, with diameters in the micrometer range. The microspheres of the present invention are hollow, that is they contain an internal void and a shell.

State of the art electrode materials based on unaltered (i.e., not substituted) Mn-containing spinel-type metal oxides, are prone to Manganese dissolution under operation conditions in an electrochemical cell.

In contrast to this, the inventors of the present invention have found that Mn-containing spinel-type metal oxides, wherein Mn is partially substituted with a substitution-element selected from the group consisting of Si, Hf, Zr, Fe, Al, V and mixtures thereof, are characterized by an improved electrochemical stability.

Without being bound by theory, the enhanced electrochemical stability of the electrode material of the present invention, is attributed to the high dissociation energies of the Si—O, Hf—O, Zr—O, Fe—O, Al—O and V—O bonds. Si, Hf, Zr, Fe, Al and V are all characterized by high oxophilicities and as such form very stable bonds with oxygen. The partial substitution of Mn with these elements does not only result in the reduction of the amount of Mn in the lattice of the Mn-containing spinel-type metal oxide, but also increases the oxygen lattice stability. In this way, undesirable dissolution of Mn into the electrolyte can be reduced or prevented.

Moreover, state of the art Mn-containing spinel-type metal oxides such as unaltered $LiMn_2O_4$ and $LiNi_{0.5}Mn_{1.5}O_4$, are usually synthesized via simple reactions of stoichiometric amounts of oxides, acetates or nitrates of the respective elements forming the spinel-type metal oxide. These reactions typically result in powders of single crystals having an octahedral geometry. In contrast to this, the primary particles of electrode materials of the present invention are preferably not octahedral in their geometry, which is a consequence of the partial substitution of the Mn in the Mn-containing spinel-type metal oxides. Single crystals having an octahedral geometry often degrade due to mechanical stress and high surface energy crystal planes, which are more reactive to the electrolyte. The higher reactivity of octahedral particles is for instance discussed by J. Akimoto et al. (Electrochemical and Solid-State Letters 2005, 8, 7, A361) or by R. Kanno et al. (Journal of The Electrochemical Society, 2007, 154, 11, A1065).

Moreover, the single crystals of state of the art Mn-containing spinel type metal oxides give powders of free particles or randomly aggregated particles. In this way, no well-ordered secondary structure (i.e., secondary particles of a well-defined geometry) is achieved in the powder. Such materials undergo significant degradation as a consequence of mechanical stress during charge and discharge when employed as an electrode material in lithium ion-based electrochemical cells.

In addition, the powders are characterized by comparatively large surface areas, which if exposed to the electrolyte during operation of a lithium-ion-based electrochemical cell, favor undesirable side reactions of the Li-ions at the interface between the electrode material and the electrolyte.

In contrast to this, the inventive electrode materials depict a well-ordered secondary structure. Namely, the primary particles of the inventive material are aggregated to secondary particles, the latter having the structure of microspheres.

The morphology of microspheres is without being bound by theory believed to support the electrochemical performance of the inventive electrode material due to the following reasons:

First, microspheres allow minimizing the surface area of the secondary particles. Therefore, the surface electrolyte interface (SEI), i.e., the interface between the electrode and the electrolyte, consumes the least amount of lithium ions and minimizes unwanted side reactions with the electrolyte.

Second, during the charging/discharging cycles, the deformation stress from stretching and shrinking of the spherical particles is axially isotropic. This leads to less micro-strains and therefore less cracks in the particle. The microspheres are thus characterized by a high mechanical and electrochemical stability under operation in an electrochemical cell.

Third, the microspheres provide isotropic and short lithium ion diffusion pathways between particle bulk and surface. The specific geometry of microspheres compared to microparticles, which are not hollow, is crucial to ensure short diffusion pathways for the lithium-ions in the Mn-containing spinel-type metal oxide.

The inventors of the present invention have accomplished to provide an electrode material, which combines the beneficial structural effects of microspheres formed from aggregated primary particles with effects related to material composition, i.e., partial substitution of Mn in the Mn-containing spinel-type metal oxide. Experiments of the inventors demonstrate that respective electrode materials are characterized by high electrochemical capacities and are furthermore capable of preserving these high capacities better than the case for most comparable electrode materials under cell operation. The electrode materials of the present invention are characterized by high cycle durability. Namely, they depict large capacities and rate capabilities even after extended amounts of charge and discharge cycles. These characteristics are beneficial for an increase in lifetime of electrochemical cells employing the inventive electrode material.

According to a preferred embodiment of the inventive electrode material, the Mn-containing spinel-type metal oxide or the electrode material as a whole, does not contain elements different from the elements selected from the group consisting of Li, Ni, Mn, O, Si, Hf, Zr, Fe, Al and V. The present invention is not dependent on further elements commonly used in electrode materials, which are often highly expensive or even toxic.

According to one embodiment of the inventive electrode material, the Mn-containing spinel-type metal oxide or the electrode material as a whole is free of cobalt (Co). Currently, many positive active materials in automotive lithium ion cells utilize materials such as $LiNi_xMn_yCo_zO_2$ (NMC). These and similar materials include cobalt that is associated with environmental issues, noxious effects, and high costs. In contrast to this, the electrode materials of the present invention are free of cobalt, which is beneficial with respect to their toxicity and environmental friendliness.

A further embodiment of the inventive electrode material of the present invention utilizes Si as a substitution-element. The inventors of the present invention have observed experimentally that electrode materials, wherein the substitution-element is Si have high electrochemical capacities and rate capabilities. The cycle durability of these materials is excellent. The enhanced electrochemical performance might be attributed to the high Si—O bond dissociation energy of 798 kJ mol$^{-1}$ at 298 K, which is far beyond of the Mn—O and Ni—O bond (being 402 kJ mol$^{-1}$ and 392 kJ mol$^{-1}$) and therefore assumed to enlarge the structural and chemical stability when silicon is incorporated into an oxygen rich crystal lattice and might suppress manganese dissolution.

According to one embodiment of the present invention, the content of the substitution-element in the Mn-containing spinel-type metal-oxide is in the range of 0.01 to 0.5 moles per 1 mole of the Mn-containing spinel-type metal-oxide, preferably in the range from 0.01 to 0.2, more preferably in the range from 0.02 to 0.15, in particular in the range from 0.02 to 0.1 and most preferably in the range from 0.05 to 0.1 moles per 1 mole of the Mn-containing spinel-type metal-oxide. In these ranges unexpectedly high capacities and rate capabilities are achieved in combination with an excellent cycle durability.

In a further embodiment of the present invention, the primary particles are not characterized by an octahedral shape. This is in contrast to unsubstituted LNMO powder, wherein the primary particles comprise an octahedral shape. Single crystals having an octahedral geometry often degrade due to mechanical stress and high energy surface planes. In contrast to this, the primary particles of the present invention are for instance plate-shaped primary particles. Nonoctahedral primary particles, such as plate-shaped primary particles, show a reduced cation ordering compared to octahedra. In spinel-type lithium-nickel-manganese-oxides this results in minimizing isolated domains of active Ni redox centers separated by inactive Mn$^{4-}$ ions and therefore the internal resistance is decreased. The non-octahedral structure of the primary particles is—without being bound by theory—at least in part caused by the aggregation of the primary particles to form microspheres. Moreover, an increased degree of substitution of Mn appears to further facilitate the formation of flat, plate-shaped particles, which do not have an octahedral geometry.

According to one embodiment of the present invention, the primary particles do not have a spherical shape. Namely, the primary particles preferably are not round and not hollow.

According to one embodiment of the present invention, the primary particles have edges and flat surfaces.

According to one embodiment, the primary particles are nanoparticles. It is preferred if the average diameter of the primary particles is in the range from 20 to 400 nm, preferably in the range from 50 to 250 nm, more preferably in the range from 75 to 125 nm. In the case of primary particles, which are of an irregular shape the average diameter is calculated as the arithmetic average of the longest and smallest distance from one to the other side of the particle.

In a preferred embodiment of the inventive electrode material, the microspheres have an average outer-diameter (d50) in the range from 1 μm to 50 μm, preferably from 2 μm to 15 μm. Microspheres with an average outer-diameter in these ranges are adapted to the requirements at the electrode of an electrochemical cell. They have good mechanical properties for forming electrode materials for electrochemical cells.

Furthermore, according to an embodiment of the present invention, the microspheres have an average inner-diameter which corresponds to 0.6 to 0.99 times the outer-diameter of the microspheres.

Microspheres wherein the ratio of the inner- and outer-diameter is in the depicted range are characterized by good mechanical and electrochemical stabilities. Moreover, respective geometries result in very beneficial conditions for the diffusion of Li-ions. The larger the inner-diameter compared to the outer-diameter the shorter is the average length of the diffusion path, for the lithium-ions and the storage capability of the Mn-containing spinel type metal-oxide is thus used more efficiently. Furthermore this is beneficial for the rate capability as the incorporation and release of Li-ions can occur faster. However, if the inner-diameter becomes very large compared to the outer-diameter, i.e., the shell of the microsphere becomes very thin, the stability of the microspheres may decrease.

According to one embodiment the microspheres have a shell with an average thickness of not less than 50 nm and not more than 5 μm, preferably not less than 100 nm and not more than 2 μm, more preferably not less than 250 nm and not more than 1 μm. In these ranges good diffusion properties for the Li-ions and reasonable mechanical stabilities of the microspheres can be achieved.

According to an embodiment of the inventive electrode material the Mn-containing spinel-type metal oxide has the general formula:

$$Li_aNi_bMn_{c-n}A_nO_{4-d}$$

with $0.9<a<1.1$, $0\leq b\leq 0.6$, $1.4\leq c\leq 2.0$, $0<n\leq 0.5$, $0\leq d$, A is the substitution element, being selected from the group consisting of Si, Hf, Zr, Fe, Al, V and mixtures thereof.

A certain oxygen non-stoichiometry, in particular an oxygen deficiency, can be present in the material (i.e., $0<d$). This is likely compensated by the presence of a certain amount of $Mn^{3+}$ ions (instead of $Mn^{4+}$ ions) in the lattice. However it is preferred if d is 0.

According to a further embodiment, a is 1.0, b is 0.0 and c is 2.0. In this case, the general formula can be written as follows:

$$LiMn_{2-n}A_nO_{4-d}$$

It is however preferred that a is 1.0, b is 0.5 and c is 1.5. In this preferred embodiment of the present invention, the Mn-containing spinel-type metal oxide has the general formula:

$$LiNi_{0.5}Mn_{1.5-n}A_nO_{4-d}$$

$LiNi_{0.5}Mn_{1.5-n}A_nO_{4-d}$ are high voltage electrode spinel materials characterized by excellent electrochemical performances in particular with respect to capacity, rate capability and cycle durability.

In general n is in the range $0.001\leq n\leq 0.5$. If n is smaller than 0.001 the beneficial effects from the substitution of Mn with the substitution element A become very weak. If n is larger than 0.5 the electrical capacity will be very low. High Si contents moreover, can reduce the electric conductivity of the particles and decrease the electrochemical performance, as Si is an electro-inactive compound.

Preferably n is in the range $0.01\leq n\leq 0.2$. In this range, both very good electrical capacities and cycle durabilities are achieved. The electrical performance further improves if n is in the range $0.02\leq n\leq 0.15$. Even more preferably, n is in the range $0.02\leq n\leq 0.1$. Most preferably, n is in the range $0.05\leq n\leq 0.1$. In these ranges, unexpectedly high capacities, rate capabilities are achieved and maintained on a very high level despite of extended charge and discharge cycles under operation in a lithium-ion-based electrochemical cell.

A second aspect of the present invention relates to the use of the invention electrode material as an active material in a lithium ion-based electrochemical cell. As described above, the invention electrode material is particularly suitable for applications in lithium-ion-based electrochemical cells.

A third aspect of the present invention relates to a lithium ion-based electrochemical cell, having a first electrode, a second electrode, and an electrolyte, the electrolyte is conductively arranged between the first and second electrode, and the first electrode includes the electrode material according to the first aspect of the present invention.

The lithium-ion-based electrochemical cell preferably is a rechargeable lithium-ion-battery. The first electrode in particular refers to the positive electrode (i.e., cathode during discharge), while the second electrode in particular refers to the negative electrode (anode during discharge) of the electrochemical cell.

The invention lithium-ion-based electrochemical cell preferably includes a separator, which can be arranged between the first and second electrode. The separator can be a porous polymer-membrane such as polyethylene (PE), polypropylene (PP) or the like.

The electrolyte can be any electrolyte as commonly used in rechargeable lithium-ion-batteries. The electrolyte in particular can be selected from the group consisting of carbonates, with a conducting salt. For instance, dimethyl-carbonate (DMC), diethyl-carbonate (DEC), ethylene-carbonate (EC), ethyl-methyl-carbonate (EMC) or mixtures thereof.

It is preferred that the electrolyte comprises a conducting salt. The conducting salt for instance can be selected from the group consisting of $LiPF_6$, $LiAsF_6$, $LiBF_4$, LiTFSI, LIBOB and mixtures thereof.

For the second electrode, standard materials, as commonly employed in rechargeable lithium-ion-batteries, can be used. The active material of the second electrode for instance can be graphite.

In a preferred embodiment, the first electrode comprises the invention electrode material as the active material.

The first and/or second electrode can also contain further components such as conductive additives and binders. Common conductive additives are conductive carbon materials such as soot, carbon blacks (e.g., Ketjen black, Acetylene black) or carbon-nanotubes (CNTs). Examples of binders are Polyvinylidene fluoride (PVDF) or CMC/SBR-binders (CMC=carboxymethyl cellulose, SBR=styrene-butadiene-rubber).

A fourth aspect the present invention relates to a method for synthesizing an electrode material according to the first aspect of the present invention, including at least the steps of: a) providing: Mn-containing microspheres, a Ni-containing starting material, a Li-containing starting material and a starting material containing a the substitution-element; b) mixing the porous $MnO_2$ microspheres and the starting materials of step a) to obtain a mixture; and c) calcinating the mixture to give the electrode material.

According to a preferred embodiment, the Mn-containing microspheres are $MnO_2$ microspheres, for example porous $MnO_2$ microspheres.

According to a further preferred embodiment, the $MnO_2$ microspheres are prepared by thermal treatment of $MnCO_3$ microspheres. The thermal treatment for instance can be performed at a temperature of above 300° C., for instance at 400° C.

The Ni-containing starting material can be a nitrate, oxide, hydroxide or acetate of nickel, in particular a Ni(III)-nitrate.

The Li-containing starting material can be a nitrate, hydroxide or acetate of lithium, in particular Li(I)-hydroxide.

The substitution-element containing material for instance can be a Si-containing starting material such as $Si(OC_2H_5)_4$ (=TEOS, i.e., tetraethyl-orthosilicate), $Si(OCH_3)_4$ (=TMOS, i.e. tetramethyl-orthosilicate), $Si(OC_3H_7)_4$ (i.e., tetra-n-propyl-orthosilicate) or $Si(OC_3H_7)_4$ (i.e., tetra-iso-propyl-orthosilicate).

The substitution-element containing material also can be a Hf-containing starting material such as $HfO_2$, $HfX_4$, wherein X is a halogen such as F, Cl, Br, I, in particular Cl.

The substitution-element containing material also can be a Zr-containing starting material such as $Zr(C_5H_7O_2)_4$, (=i.e., zirconium (IV)-acetyl-acetonate), zirconium (IV)-ethoxide, zirconium-hydroxide, zirconium-acrylate, etc.

The substitution-element containing material also can be a Al-containing starting material such as Aluminum (III) Nitrate-9-Hydrate $Al(NO_3)_3 \cdot 9H_2O$.

The substitution-element containing material also can be a Fe-containing starting material such as Iron (III) Nitrate nonahydrate $Fe(NO_3)_3 \cdot H_2O$.

The substitution-element containing material also can be a V-containing starting material such as vanadium acetyl acetonate.

According to a preferred embodiment the mixing step b) is performed in the presence of an alcohol such as ethanol, where the starting materials and $MnO_2$ microspheres are dispersed and stirred at room temperature until the alcohol is evaporated.

According to a preferred embodiment a grinding step is performed after step b) but before step c).

Moreover, according to a further embodiment the calcination step c) is performed at a temperature between 500 and 1000° C., preferably at 700-900° C., for instance at 800° C.

The calcination step c) can take at least 1 hour, preferably at least 10 hours, for instance between 15 and 25 hours.

In the following the present invention is explained in more detail on the basis of Figures and Examples.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
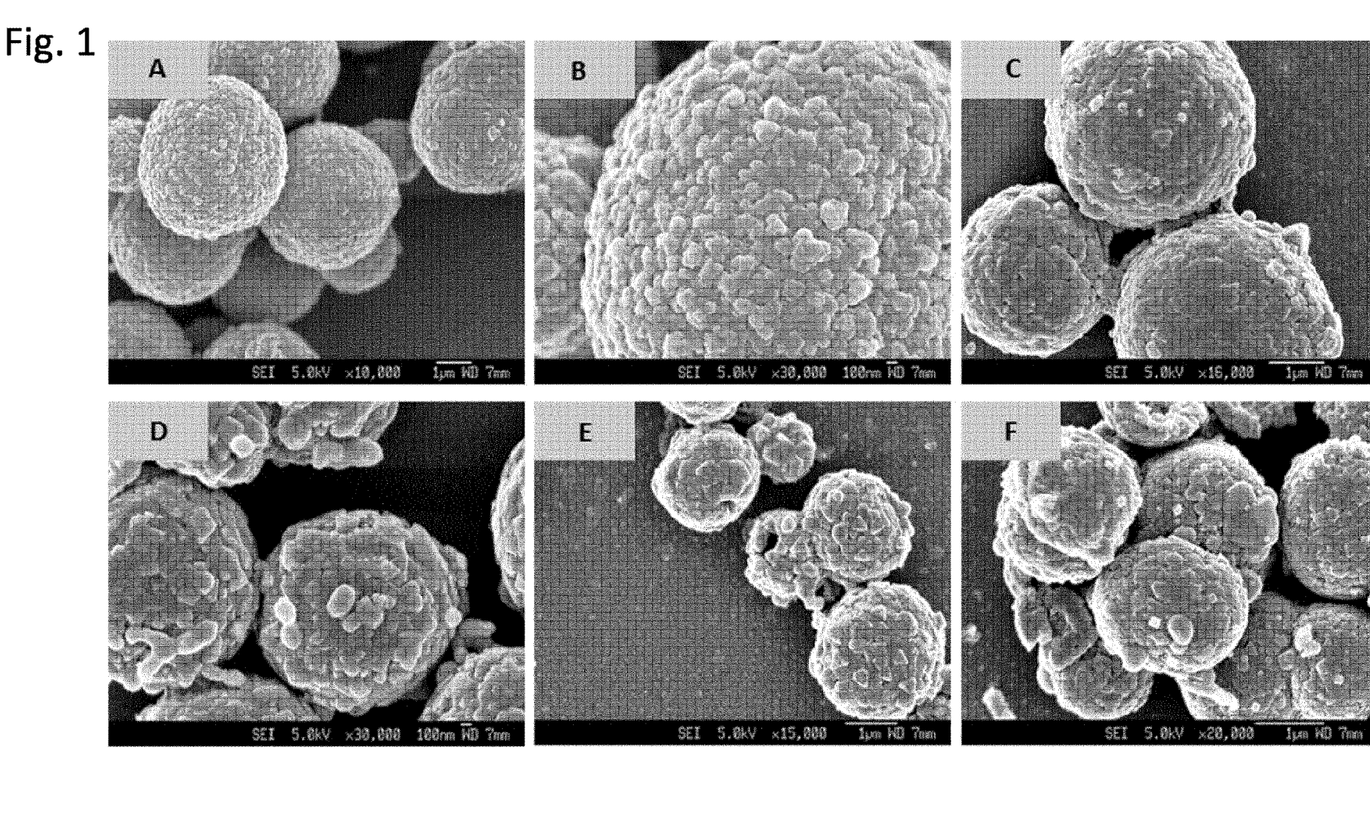
FIG. 1 shows FESEM images (i.e., Field Emission Scanning Electron Microscopy images) of $LiNi_{0.5}Mn_{1.5}O_4$ (1A, 1B), $LiNi_{0.5}Mn_{1.45}Si_{0.05}O_4$ (1C), $LiNi_{0.5}Mn_{1.4}Si_{0.10}O_4$ (1D), $LiNi_{0.5}Mn_{1.35}Si_{0.15}O_4$ (1E) and $LiNi_{0.5}Mn_{1.3}Si_{0.20}O_4$ (1F).

The morphology of the inventive materials was studied with high-resolution field-emission scanning electron microscopy (FE-SEM: JEOL JSM7600F) at an accelerating voltage of 5 kV. The samples were mounted on metal stubs using conductive double-sided carbon tape, and a thin layer of platinum was sputtered on the sample using JEOL JFC-1200 prior to scanning. Specifically, FIG. 1 shows FESEM-images of not substituted $LiNi_{0.5}Mn_{1.5}O_4$ materials (FIGS. 1A and 1B) and inventive materials (FIGS. 1C to 1F), wherein Mn is partially substituted with Si. The scale of the images (1A), (1C), (1E), (1F) is 1 µm and for images (B) and (D) is 100 nm. All samples are composed of uniform microspheres with diameters in the range from 1 to 5 µm. The microspheres of the present invention are formed from primary particles, which are aggregated into secondary particles having a microsphere structure. The primary particles have a non-octahedral geometry. The geometry can rather be described as a plate-shaped geometry, i.e., the primary particles comprise edges and flat surfaces. The particles can be characterized as flat particles. The size of the primary particles is approximately 100 nm in diameter. The formation of nanoplates on the surface of the spherical particles is more pronounced for higher silicon contents, whereas in general no sufficient visible change in morphology is detected by substitution of Mn with Si, indicating that the applied templating approach based on $MnO_2$ is a useful strategy to preserve the spherical morphology when incorporating the substitution-element.

Figure 2:
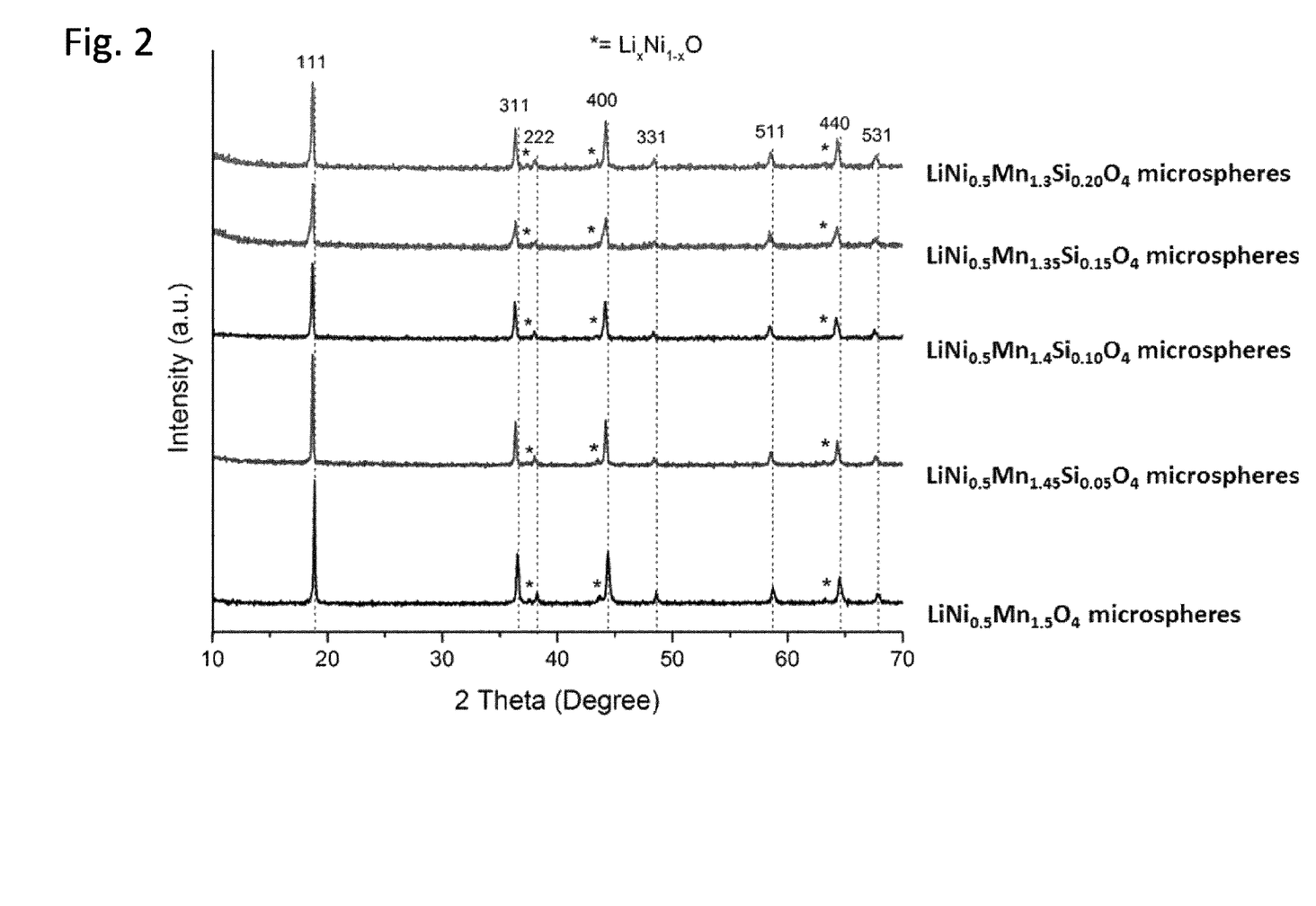
FIG. 2 shows XRD patterns of $LiNi_{0.5}Mn_{1.5}O_4$, $LiNi_{0.5}Mn_{1.45}Si_{0.05}O_4$, $LiNi_{0.5}Mn_{1.4}Si_{0.10}O_4$, $LiNi_{0.5}Mn_{1.35}Si_{0.15}O_4$ and $LiNi_{0.5}Mn_{1.3}Si_{0.20}O_4$.

X-ray diffraction (XRD) was measured using a Bruker Advanced D8 XRD diffractometer operating at 40 kV, $CU_{K\alpha}$ radiation over the angular range 10 to 80° 2θ at 0.02° incremental step. The XRD data were characterized using the crystallographic software TOPAS 3. The XRD patterns of $LiNi_{0.5}Mn_{1.5}O_4$ microspheres and $LiNi_{0.5}Mn_{1.5}O_4$ microspheres, wherein Mn is partially substituted with Si according to the present invention, are shown in FIG. 2. Sequence and sharpness of the peaks indicate a cubic spinel crystal structure (either Fd-3m or $P4_332$ space group) and well-crystallized materials. Minor residues peaks centered at 2θ=37.51°, 43.62°, and 63.43° are observed that can be attributed to rock salt phase impurities such as $Ni_xO$, $Li_xNi_{1-x}O$ or $Li_xNi_yMn_zO$. Rock salt phase impurities are typically associated with $Mn^{3+}$ ions and disordered cubic Fd-3m space group. It needs to be emphasized that the disordered Fd-3m phase is insufficiently stoichiometric, the correct formula of the here discussed materials should be $LiNi_{0.5}Mn_{1.5-n}Si_nO_{4-d}$ in which d indicates the oxygen deficiency, although the $LiNi_{0.5}Mn_{1.5-n}Si_nO_4$ designation is used for the examples depicted in the specification.

Figure 3:
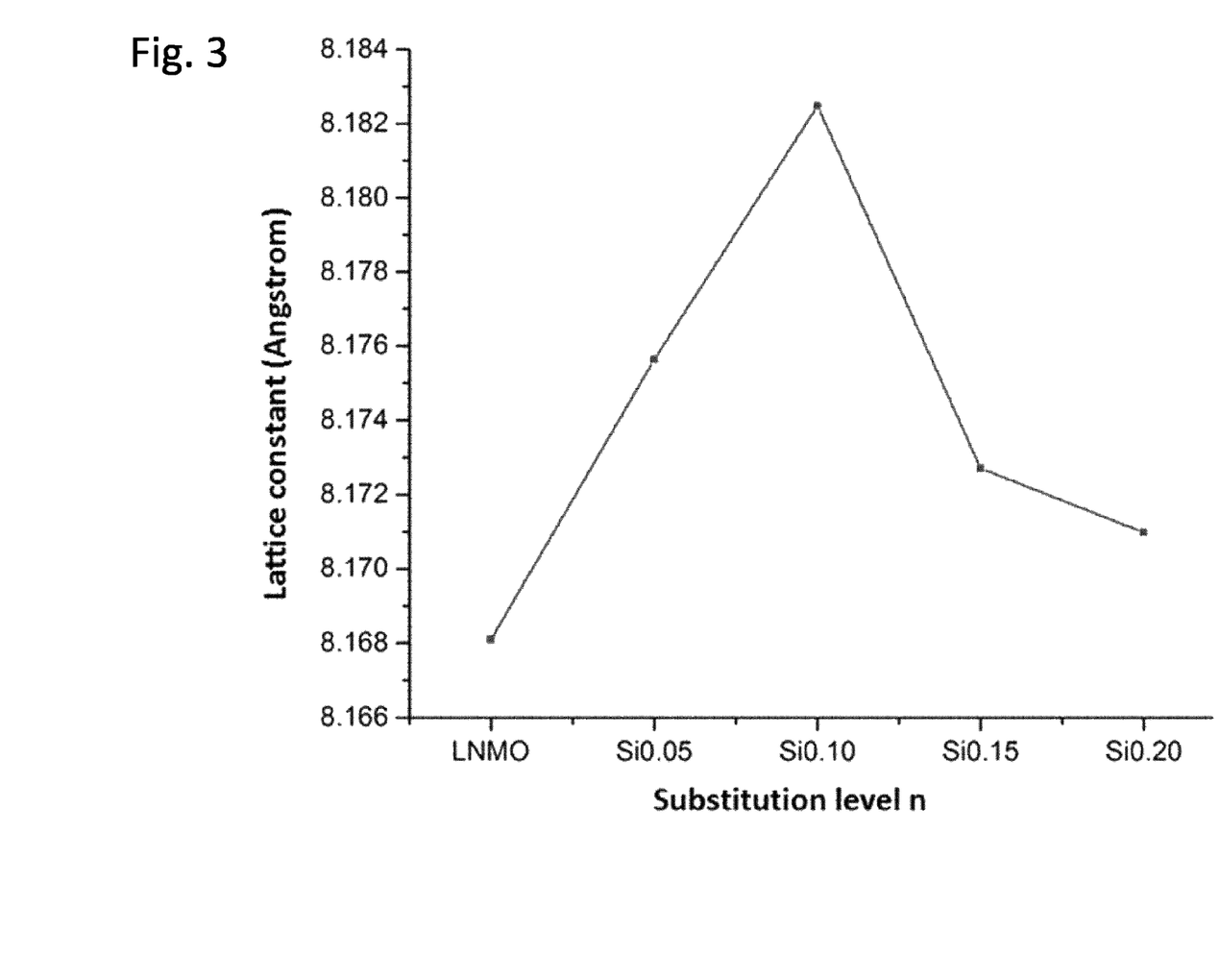
FIG. 3 depicts the dependency of the lattice constant in Angstrom versus the amount n of the substitution-element Si.

FIG. 3 depicts the dependency of the lattice constant a in Angstrom versus the amount n of the substitution-element Si in more detail. The lattice parameters a in Angstrom (Å) are calculated from Rietveld analysis and found to be 8.168 (1) Å for $LiNi_{0.5}Mn_{1.5}O_4$ (=LNMO), while for inventive samples—with Mn being partially substituted with small amounts of Si—slightly enlarged lattice constants of 8.175 (6) Å ($LiNi_{0.5}Mn_{1.45}Si_{0.05}O_4$), 8.182 (5) Å ($LiNi_{0.5}Mn_{1.4}Si_{0.10}O_4$) are observed. However, larger amounts of Si result in a decline in lattice constant. 8.172 (7) Å is observed for $LiNi_{0.5}Mn_{1.35}Si_{0.15}O_4$, and 8.171 (1) Å is observed for $LiNi_{0.5}Mn_{1.3}Si_{0.20}O_4$. The increase of the lattice constant/periodic repeating unit is thus largest in the range between n=0.05 and n=0.15. This might be due to an increased amount of $Mn^{3+}$ ions, which exhibit a larger ionic radius than $Mn^{4+}$ ions, 64.5 pm and 53 pm, respectively.

In general, $LiNi_{0.5}Mn_{1.5}O_4$ crystallizes in two different cubic space groups depending on the distribution of manganese and nickel in the crystal lattice. For $P4_332$ nickel and manganese occupy the 4a and 12d sites, respectively (ordered structure). For Fd-3m nickel and manganese ions are randomly distributed in the octahedral 16d sites (disordered structure). A slight oxygen non-stoichiometry is found for the Fd-3m structure, which is likely compensated by the presence of a sufficient amount of $Mn^{3+}$. An appropriate amount of $Mn^{3+}$ may enhance the electrochemical performance.

The electrochemical active manganese species participates in the redox reaction, which supports compensation of capacity loss caused by substitution of nickel by other elements.

Furthermore, $Mn^{3+}$ ions support the electron hopping conduction mechanism by acting as internal carriers according to $Ni^{2+/3+} \rightarrow Mn^{4+} \rightarrow Ni^{3+/4+}$ as well as $Ni^{2+/3+} \rightarrow Mn^{4+}$ $Mn^{3+} \rightarrow Ni^{3+/4+}$. These two additional pathways are not present at the $P4_332$ polymorph leading to comparatively faster charge transfer in the Fd-3m system. Also, it is assumed that the disordered Fd-3m phase supports the electrochemical performance by its comparatively higher conductivity for electrons and lithium ions. Moreover, the disordered occupancy of nickel and manganese is assumed to decrease the internal resistance since $Ni^{2+/3+/4+}$ electrochemically active centers isolated by inactive $Mn^{4+}$ become accessible.

The properties of the samples were characterized by performing electrochemical experiments. For this purpose a composite cathode was prepared by mixing active material ($LiNi_{0.5}Mn_{1.5-n}Si_nO_4$), conducting additive (Timcal, Super C65) and PVDF binder (Kynar 2801) (70:20:10), using N-methyl pyrrolidone (NMP, Sigma Aldrich) as solvent. The resulting slurry was coated on Al foil (20 μm in thickness, Targray) using doctor blade technique and subsequently dried in an oven at 80° C. The coated foils were pressed between stainless steel twin rollers to ensure good adhesion and punched into circular discs of 16 mm in diameter. Counter electrode lithium foil (~0.59 mm thick, Hohsen Corporation, Japan) of the same diameter was used for cell fabrication. The test cells were fabricated in CR2016 coin cell electrode in an argon-filled glovebox ($H_2O$, $O_2$<0.1 ppm, Mbraun, Unilab, USA). LP50 electrolyte (Charlston Technologies PTE LTD, 1M $LiPF_6$ solution in ethylene carbonate (EC)-ethyl methyl carbonate (EMC) (1:1 Gew. %/Gew. %) and separator (Celgard 2400) was used for cell assembly. The electrochemical tests of the cells were conducted in an automatic galvanostatic charge-discharge unit, battery cycler (BTS XWJ, Neware Tech. Co.), between 3.0V to 5.0V at room temperature at a current density of 1 C based on cell configuration. Some results with respect to the electrochemical characterization are depicted in FIGS. 4 and 5.

Figure 4:
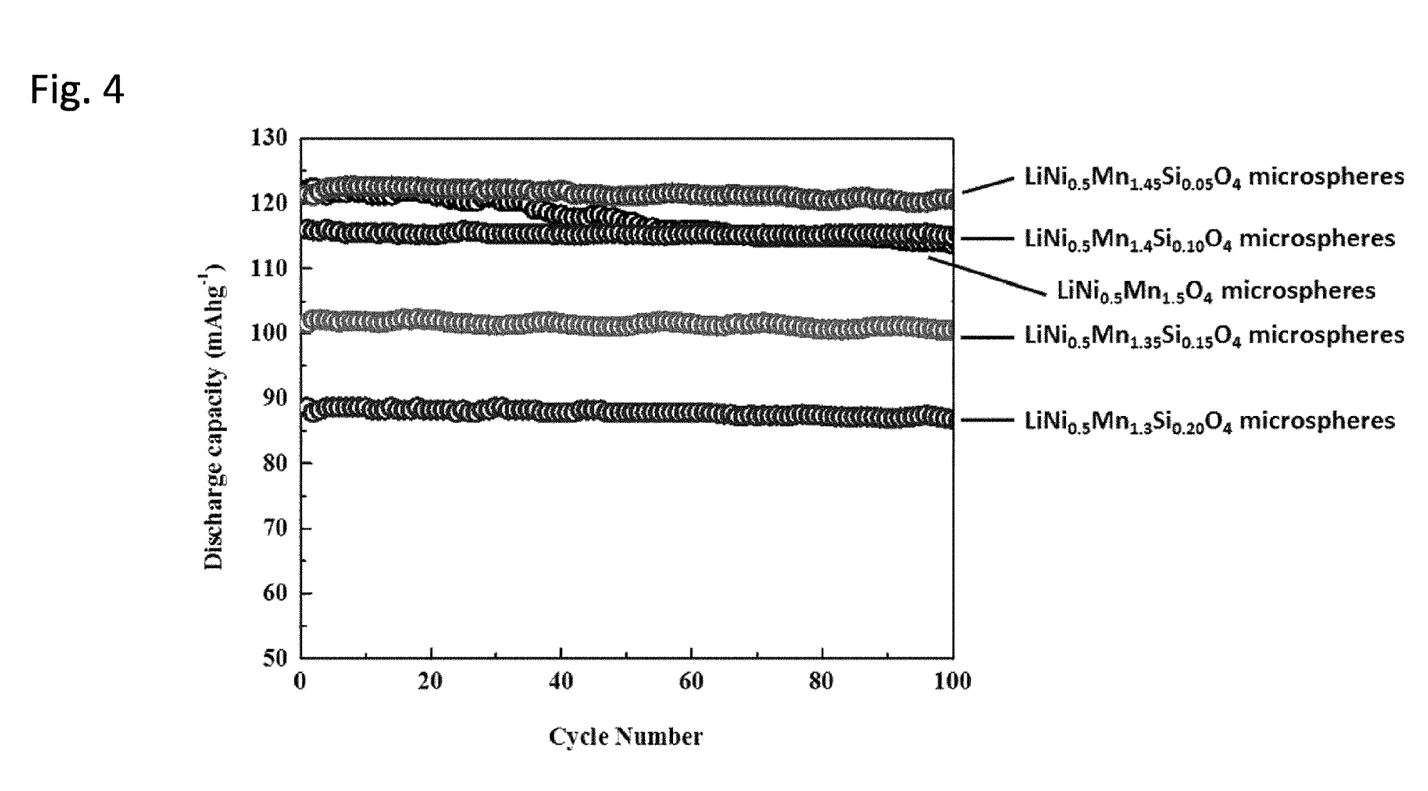
FIG. 4 shows the electrochemical performance of $LiNi_{0.5}Mn_{1.5}O_4$, $LiNi_{0.5}Mn_{1.45}Si_{0.05}O_4$, $LiNi_{0.5}Mn_{1.4}Si_{0.10}O_4$, $LiNi_{0.5}Mn_{1.35}Si_{0.15}O_4$ and $LiNi_{0.5}Mn_{1.3}Si_{0.20}O_4$, at room temperature, at 1 C rate.

FIG. 4 shows the cycling performance of $LiNi_{0.5}Mn_{1.5}O_4$, $LiNi_{0.5}Mn_{1.45}Si_{0.05}O_4$, $LiNi_{0.5}Mn_{1.4}Si_{0.10}O_4$, $LiNi_{0.5}Mn_{1.35}Si_{0.15}O_4$ and $LiNi_{0.5}Mn_{1.3}Si_{0.20}O_4$, at room temperature, at 1 C rate. The sample with the silicon content of 0.05 moles and the pristine (i.e., not-substituted) $LiNi_{0.5}Mn_{1.5}O_4$ material show comparable behavior in terms of capacities in the range of 120 $mAhg^{-1}$ and high stabilities until cycle number 40, where for the pristine $LiNi_{0.5}Mn_{1.5}O_4$ sample the capacity begins to fade. In general, all silicon-substituted samples exhibit superior cycling stability over pristine $LiNi_{0.5}Mn_{1.5}O_4$, supporting the theory that silicon stabilizes an oxygen rich crystal lattice associated with enhanced electrochemical performance.

Figure 5:
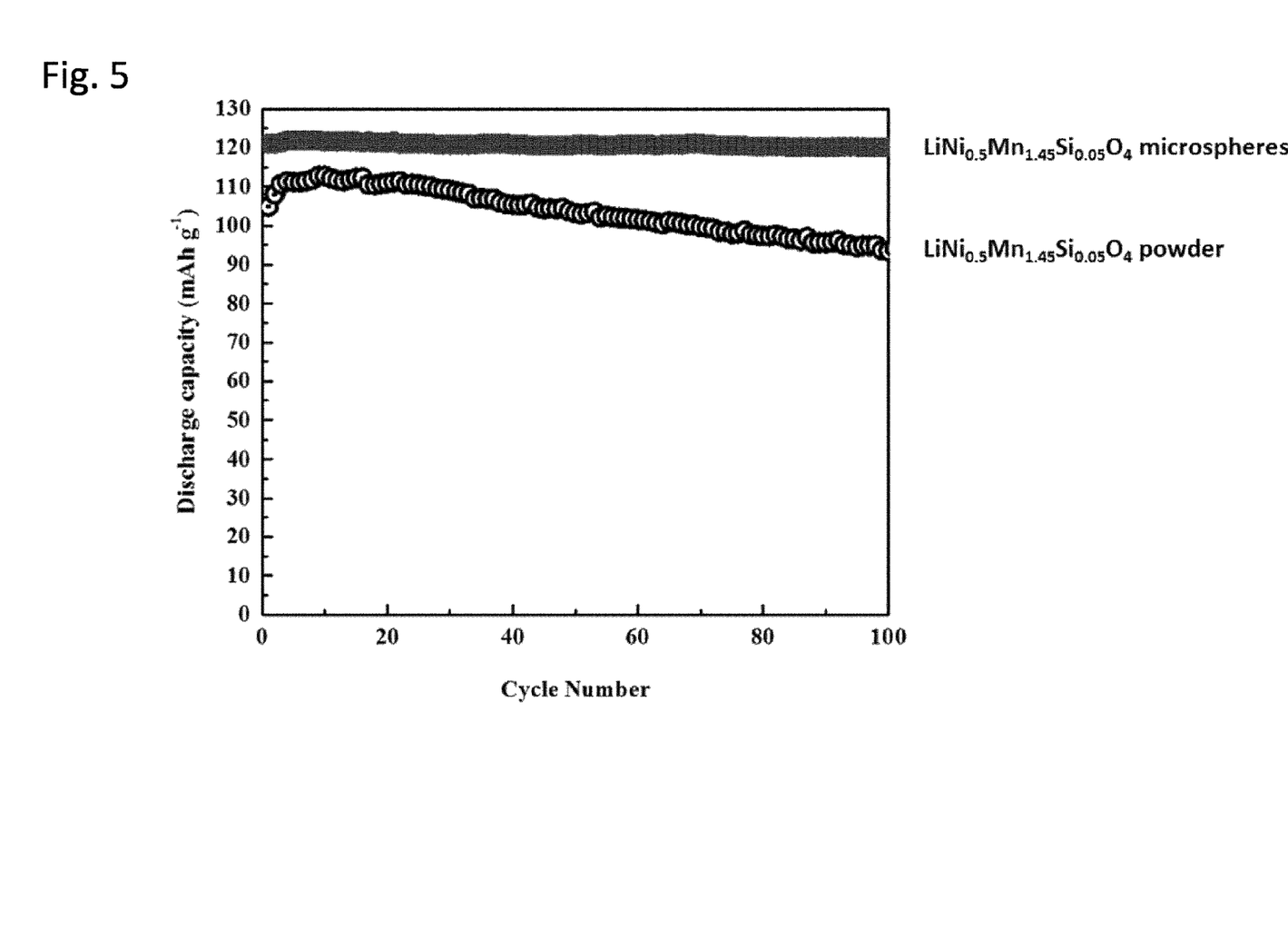
FIG. 5 compares the electrochemical performance of $LiNi_{0.5}Mn_{1.45}Si_{0.05}O_4$-powder with $LiNi_{0.5}Mn_{1.45}Si_{0.05}O_4$-microspheres.

FIG. 5 compares the electrochemical performance of $LiNi_{0.5}Mn_{1.45}Si_{0.05}O_4$-powder with $LiNi_{0.5}Mn_{1.45}Si_{0.05}O_4$-microspheres. It is evident from FIG. 5 that the electrochemical performance against $Li/Li^+$, is superior for $LiNi_{0.5}Mn_{1.45}Si_{0.05}O_4$-microspheres compared to $LiNi_{0.5}Mn_{1.45}Si_{0.05}O_4$-powder. The microsphere structure thus evidently results in improved capacities and cycling durabilities over powders, wherein no microspheres are present.

Synthesis:

In the following, the synthesis of invention electrode materials is illustrated for the example of Si-substituted $LiNi_{0.5}Mn_{1.5}O_4$:

$LiNi_{0.5}Mn_{1.5}O_4$, $LiNi_{0.5}Mn_{1.45}Si_{0.05}O_4$, $LiNi_{0.5}Mn_{1.4}Si_{0.10}O_4$, $LiNi_{0.5}Mn_{1.35}Si_{0.15}O_4$ and $LiNi_{0.5}Mn_{1.3}Si_{0.20}O_4$ were obtained using the following starting materials:

Manganese (II) nitrate tetrahydrate (($MnN_2O_6*4H_2O$) Sigma Aldrich 97%), Ammonium bicarbonate (($NH_4HCO_3$) Sigma Aldrich 99.5%), Nickel (II) Nitrate hexahydrate (($Ni(NO_3)_2*6H_2O$) Alfa Aeser 97%), Lithium hydroxide monohydrate (($LiOH*H_2O$) Sigma Aldrich >99.5%) and Tetraethyl orthosilicate (TEOS, $Si(OC_2H_5)_4$) Sigma Aldrich 99.99%).

The synthesis was performed as follows:

$LiNi_{0.5}Mn_{1.5}O_4$ where Mn is substituted with Si, with microsphere morphology, was synthesized via a templating approach based on $MnO_2$ microspheres. $MnO_2$ was obtained by a co-precipitation method followed by thermal decomposition as discussed elsewhere (Zhou et al. Angew. Chemie—Int. Ed., Vol. 51, no. 1, pp. 239-241, 2012). 7.5 mmol of $MnN_2O_6*4H_2O$ and 75 mmol of $NH_4HCO_3$ were separately dissolved in 525 mL of distilled water. 52.5 mL of ethanol and the $NH_4HCO_3$ solution were then added to the $MnN_2O_6*4H_2O$ solution in sequence under stirring. The mixture was stirred for 3 h at room temperature and centrifuged. The sample was then washed with water and ethanol three times each. The as-obtained $MnCO_3$ microspheres were dried at 80° C. The porous $MnO_2$ microspheres were synthesized by thermal decomposition of the $MnCO_3$ microspheres at 400° C. for 10 hours. To obtain $LiNi_{0.5}Mn_{1.5-n}Si_nO_4$ microspheres, 15 mmol of $MnO_2$ microspheres, 5 mmol of $Ni(NO_3)_2*6H_2O$, 10.4 mmol of $LiOH*H_2O$ were dispersed in 15 mL of absolute ethanol, stoichiometric amounts of TEOS as a Si-source, were added into the mixture. The Si concentration was varied from 0.05-0.2 moles. The ethanol was evaporated slowly at room temperature under stirring. The mixture obtained was ground manually for 10 min and then calcined at 800° C. for 20 hours in air.

The synthesis of respective Mn-containing spinel-type metal oxides, such as $LiNi_{0.5}Mn_{1.5}O_4$, wherein Mn is partially substituted with further elements such as Hf, Zr, Fe, Al, V can be performed in the same way. Suitable sources for Hf, Zr, Fe, Al, V as described above when describing the fourth aspect of the present invention.

Example for a Lithium-Ion-Based Electrochemical Cell:

An example for a lithium-ion-based electrochemical cell according to the third aspect of the present invention is given in the following (mass % refer to the mass of the complete electrode). The example refers to a rechargeable lithium-ion-battery that includes the following parts:

First electrode:
92 mass % $LiNi_{0.5}Mn_{1.45}Si_{0.05}O_4$ (active material); 8 mass % Carbon black (conductive additive); 8 mass % PVDF (binder).

Second electrode:
96 mass % graphite; 1 mass % Carbon black (conductive additive); 3 mass % PVDF (binder).

Separator: Celgard 2400

Electrolyte: EC: EMC-mixture (1:1 wt. %);

Conducting salt: 1M $LiPF_6$

The invention is not restricted by the examples given in the specification. The invention comprises any feature or combination of features described in the specification and claims, even if not explicitly depicted in this specific combination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrode material for a lithium ion-based electrochemical cell, comprising:
   primary particles of a Mn-containing spinel-type metal oxide selected from the group consisting of: spinel-type lithium-nickel-manganese-oxide, spinel-type lithium-manganese-oxide, and mixtures thereof,
   wherein Mn of the Mn-containing spinel-type metal oxide is partially substituted with a substitution-element selected from the group consisting of Si, Hf, Zr, Fe, Al, V and mixtures thereof,
   and wherein the primary particles are aggregated in order to form secondary particles, the secondary particles having the shape of microspheres.

2. The electrode material according to claim 1, wherein the substitution-element is Si.

3. The electrode material according to claim 1, wherein the content of the substitution-element in the Mn-containing spinel-type metal oxide is in the range from 0.01 to 0.5 moles per 1 mole of the Mn-containing spinel-type metal oxide.

4. The electrode material according to claim 1, wherein the content of the substitution-element in the Mn-containing spinel-type metal oxide is in the range from 0.05 to 0.1 moles per 1 mole of the Mn-containing spinel-type metal oxide.

5. The electrode material according to claim 1, wherein the primary particles are nanoparticles, which do not have an octahedral geometry.

6. The electrode material according to claim 1, wherein the microspheres have an average outer-diameter in the range from 1 μm to 50 μm.

7. The electrode material according to claim 1, wherein the microspheres have an average outer-diameter in the range from 2 μm to 15 μm.

8. The electrode material according to claim 1, wherein the microspheres have an average inner-diameter which corresponds to 0.6 to 0.99 times the outer-diameter.

9. The electrode material according to claim 1, wherein the Mn-containing spinel-type metal oxide has the general formula:

$Li_aNi_bMn_{c-n}A_nO_{4-d}$ with $0.9 < a < 1.1$,
$0 \leq b \leq 0.6$,
$1.4 \leq c \leq 2.0$,
$0 < n \leq 0.5$,
$0 \leq d$,
wherein A is the substitution-element, being selected from the group consisting of Si, Hf, Zr, Fe, Al, V and mixtures thereof.

10. The electrode material according to claim 9, wherein $a=1.0$, $b=0.5$, and $c=1.5$.

11. The electrode material according to claim 9, wherein $a=1.0$, $b=0.0$, and $c=2.0$.

12. The electrode material according to claim 9, wherein $0.001 \leq n \leq 0.5$.

13. The electrode material according to claim 9, wherein $0.05 \leq n \leq 0.1$.

14. Lithium ion-based electrochemical cell, comprising:
   a first electrode,
   a second electrode, and
   an electrolyte,
   wherein the electrolyte is conductively arranged between the first and second electrode, and
   wherein the first electrode comprises an electrode material comprising primary particles of a Mn-containing spinel-type metal oxide selected from the group consisting of: spinel-type lithium-nickel-manganese-oxide, spinel-type lithium-manganese-oxide, and mixtures thereof, wherein Mn of the Mn-containing spinel-type metal oxide is partially substituted with a substitution-element selected from the group consisting of Si, Hf, Zr, Fe, Al, V and mixtures thereof, and wherein the primary particles are aggregated in order to form secondary particles, the secondary particles having the shape of microspheres, as an active material.

15. A method for synthesizing an electrode material for a lithium ion-based electrochemical cell, the electrode material comprises primary particles of a Mn-containing spinel-type metal oxide selected from the group consisting of: spinel-type lithium-nickel-manganese-oxide, spinel-type lithium-manganese-oxide, and mixtures thereof, wherein Mn of the Mn-containing spinel-type metal oxide is partially substituted with a substitution-element selected from the group consisting of Si, Hf, Zr, Fe, Al, V and mixtures thereof, and wherein the primary particles are aggregated in order to form secondary particles, the secondary particles having the shape of microspheres;
   the method comprising at least the steps of:
   a) providing:
      Mn-containing microspheres,
      a Ni-containing starting material,
      a Li-containing starting material, and
      a starting material containing the substitution-element;
   b) mixing the Mn-containing microspheres and the starting materials of step a) to obtain a mixture; and
   c) calcinating the mixture to give the electrode material.

16. The method of claim 15, wherein the Mn-containing microspheres are porous $MnO_2$ microspheres.

* * * * *